United States Patent
Yaung (10) Patent No.: US 6,512,850 B2
(45) Date of Patent: Jan. 28, 2003

(54) METHOD OF AND APPARATUS FOR IDENTIFYING SUBSETS OF INTERRELATED IMAGE OBJECTS FROM A SET OF IMAGE OBJECTS

(75) Inventor: Alan Tsu-I Yaung, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/208,722

(22) Filed: Dec. 9, 1998

(65) Prior Publication Data

US 2002/0097914 A1 Jul. 25, 2002

(51) Int. Cl.⁷ .............................. G06K 9/62; G06K 9/68; G06K 9/46
(52) U.S. Cl. ...................... 382/225; 382/218; 382/195
(58) Field of Search .......................... 382/225, 218, 382/219, 190, 195, 128, 131, 132; 707/6, 100

(56) References Cited

U.S. PATENT DOCUMENTS

| | | | | |
|---|---|---|---|---|
| 5,864,855 A | * | 1/1999 | Ruocco et al. | 707/10 |
| 5,915,250 A | * | 6/1999 | Jain et al. | 707/100 |
| 6,049,797 A | * | 4/2000 | Guha et al. | 707/6 |
| 6,104,835 A | * | 8/2000 | Han | 382/225 |
| 6,240,423 B1 | * | 5/2001 | Hirata | 707/104 |
| 6,240,424 B1 | * | 5/2001 | Hirata | 707/104 |
| 6,269,358 B1 | * | 7/2001 | Hirata | 707/1 |

FOREIGN PATENT DOCUMENTS

WO   WO9846998 A   10/1998   .......... G01N/33/53

OTHER PUBLICATIONS

Xiang et al, "Color Image Quantization by Agglomerative Clustering"; IEEE Computer graphics and Applications, ISSN: 0272–1716, vol. 14, Issue 3, pp. 44–48, May 1994.*

"A New Approach to Image Retrieval With Hierarchical Color Clustering", Xia Wan, et al., XP–000779459 IEEE Transactions on Circuits and Systems for Video Technology, vol. 8, No. 5, Sep. 1998.

"Automatic Document Classification", G. Salton, XP–002133538, Jan. 1989, Addison–Wesley.

Karypis et al., "Chameleon: Hierarchical Clustering Using Dynamic Modeling", *IEEE Computer*, pp. 68–75, Aug., 1999.

Ganti, et al., "Mining Very Large Databases", *IEEE Computer*, pp. 38–45, Aug. 1999.

* cited by examiner

Primary Examiner—Joseph Mancuso
Assistant Examiner—Mehrdad Dastouri
(74) Attorney, Agent, or Firm—Sawyer Law Group LLP (57) ABSTRACT

In one example given, a query for identifying interrelationships between image objects of a set of image objects is received from an input device. Each of a plurality of similarity values between all image objects of the set is compared with threshold criteria from the query. Clusters of image object identifiers are generated based on comparing and are visually displayed on a visual output device.

10 Claims, 11 Drawing Sheets

(3 of 11 Drawing Sheet(s) Filed in Color)

| THRESHOLD | CLUSTER NUMBER | CLUSTERS OF IMAGE OBJECT IDENTIFIERS | NUMBER OF IMAGES | COHESION INDEX |
|---|---|---|---|---|
| 90 | 1 | {8,10,27} | 3 | 91 |
| | 2 | {15,19} | 2 | 91 |
| | 3 | {25,33} | 2 | 90 |
| | 4 | {30,31,32} | 3 | 91 |
| 80 | 1 | {5,11} | 2 | 84 |
| | 2 | {1,12,26} | 3 | 78 |
| | 3 | {9,15,16,19,20,21,29} | 7 | 71 |
| | 4 | {6,17,22,23} | 4 | 78 |
| | 5 | {25,33} | 2 | 90 |
| | 6 | {2,3,4,7,8,10,18,27,30,31,32} | 11 | 73 |
| 70 | 1 | {1,12,13,26} | 4 | 73 |
| | 2 | {2,3,4,5,6,7,8,9,10,11,15,16,17,18,19,20,21,22, 23,25,27,28,29,30,31,32,33} | 27 | 52 |
| 60 | 1 | {1,2,3,4,5,6,7,8,9,10,11,12,13,15,16,17,18,19,20, 21,22,23,24,25,26,27,28,29,30,31,32,33} | 32 | 44 |
| 50 | 1 | {1,2,3,4,5,6,7,8,9,10,11,12,13,15,16,17,18,19,20, 21,22,23,24,25,26,27,28,29,30,31,32,33} | 32 | 44 |
| below 50 | 1 | {1,2,3,4,5,6,7,8,9,10,11,12,13,14,15,16,17, 18,19,20,21,22,23,24,25,26,27,28,29,30, 31,32,33} | 33 | 42 |

METHOD OF AND APPARATUS FOR IDENTIFYING SUBSETS OF INTERRELATED IMAGE OBJECTS FROM A SET OF IMAGE OBJECTS

BACKGROUND OF THE INVENTION

1. Field of the Invention

The present invention relates generally to identifying image objects in a set of image objects, and more particularly to identifying interrelated image objects from a set of image objects.

2. Description of the Related Art

Query by image content (QBIC) is a useful technology that allows a user to query a collection of images based on visual characteristics, such as average color, color distribution, color layout, and texture. A number of publications describing QBIC exist; for example, Image Search User's Guide and Reference, Version 2.0.1 (1997), provided by International Business Machines (IBM) Corporation, Armonk, N.Y.; and U.S. Pat. No. 5,579,471, Barber et al., "IMAGE QUERY SYSTEM AND METHOD" issued on Nov. 26, 1996.

In a system employing QBIC technology, the number of image objects available for searching may be quite large, making it difficult to assess and understand the entire contents of the collection. Unfortunately, conventional technology does not yet provide a suitable means to analyze a collection of images to understand the taxonomy of those images. That is, conventional image queries alone provide very little, if any, "visual mining" capability. The ability to form relationships between images of a set may be particularly important to some businesses such as advertising agencies, animation production firms, etc.

Accordingly, it is desirable to provide means for clustering images in an analytical manner so that their underlying nature can be understood.

SUMMARY OF THE PRESENT INVENTION

A method and apparatus described herein provides a means for identifying a subset of interrelated image objects from a set of image objects. In one example, a query for identifying an interrelationship between image objects of a set of image objects is received. Each of a plurality of similarity values between image objects of the set is compared with threshold criteria from the query. A number of clusters of image object identifiers may be generated based on comparing.

BRIEF DESCRIPTION OF THE DRAWINGS

The file of this patent contains at least one drawing executed in color (FIGS. 8–13). Copies of this patent with color drawings will be provided by the Patent and Trademark Office upon request and payment of the necessary fee.

DETAILED DESCRIPTION OF THE PREFERRED EMBODIMENTS

Figure 1:
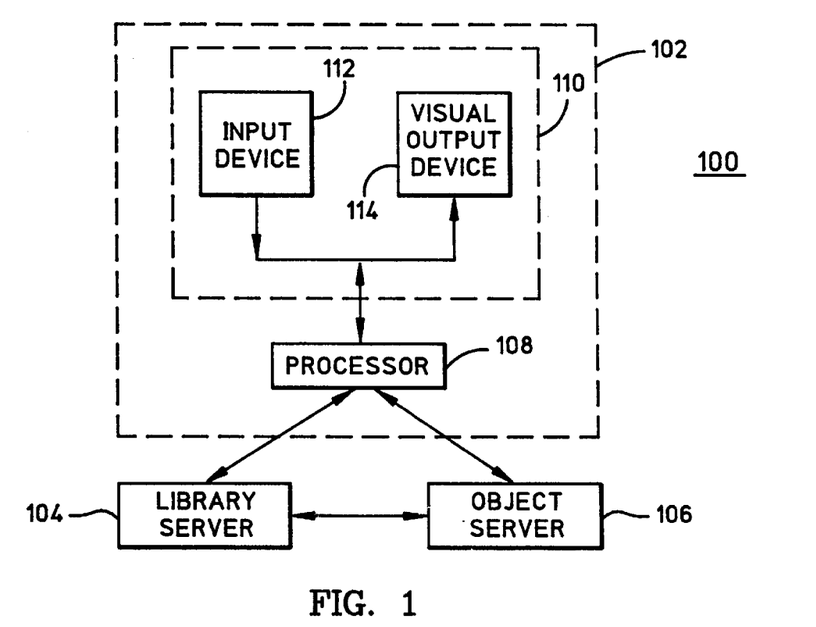
FIG. 1 is a block diagram of a computer system including a client, a library server, and an object server.

FIG. 1 is a block diagram of a computer system 100 having a client 102, a library server 104, and an object server 106. In the embodiment shown, computer system 100 is based upon Digital Library (DL) architecture provided by International Business Machines (IBM) Corporation. DL is currently based on a triangular client/server model comprised of library server 104, one or more object servers such as object server 106, and one or more clients such as client 102. IBM's DL is described in Image Search User's Guide and Reference, Version 2.0.1 (1997), provided by International Business Machines (IBM) Corporation, and is incorporated herein by reference.

Reviewing some conventional aspects in such environment, client 102 typically includes a processor 108 and a user interface 110. User interface 110 includes an input device 112 used for communicating data, such as command and user data, to processor 108; a user may enter image. queries at input device 112. User interface 110 also includes a visual output device 114 provided for visually displaying data, such as image objects stored in object server 106, through processor 108 and responsive to commands and/or queries from user interface 110. Client 102 may be a conventional desktop computer, where input device 112 includes a computer keyboard and visual output device 114 includes a visual display monitor. Input device 112 may also include a computer mouse and the visual display monitor for inputting commands and user data.

Library server 104 manages the DL catalog information, locates stored objects using a variety of search technologies, provides secure access to the objects in the collection, and communicates with object servers such as object server 106. Library server 104 uses a relational database to manage digital objects and provides data integrity by maintaining index information and controlling access to objects stored on the object servers. The database can be, for example, the IBM DB2 Universal Database, provided by IBM, or Oracle, provided by Oracle Corporation. Library server 104 may run on, for example, Advanced Interactive Executive (AIX) provided by IBM, Windows provided by Microsoft Corporation, or Operating System/2 (OS/2) provided by IBM.

Object server 106 is the repository for image objects stored in computer system 100. Users store and retrieve image objects from object server 106 through requests routed by library server 104. Object server 106 manages storage resources based on the storage management entities (such as volumes) that are defined through a system administration program. A database on object server 106 contains data about the exact location of each object. The database can be, for example, the IBM DB2 Universal Database or Oracle.

Figure 2:
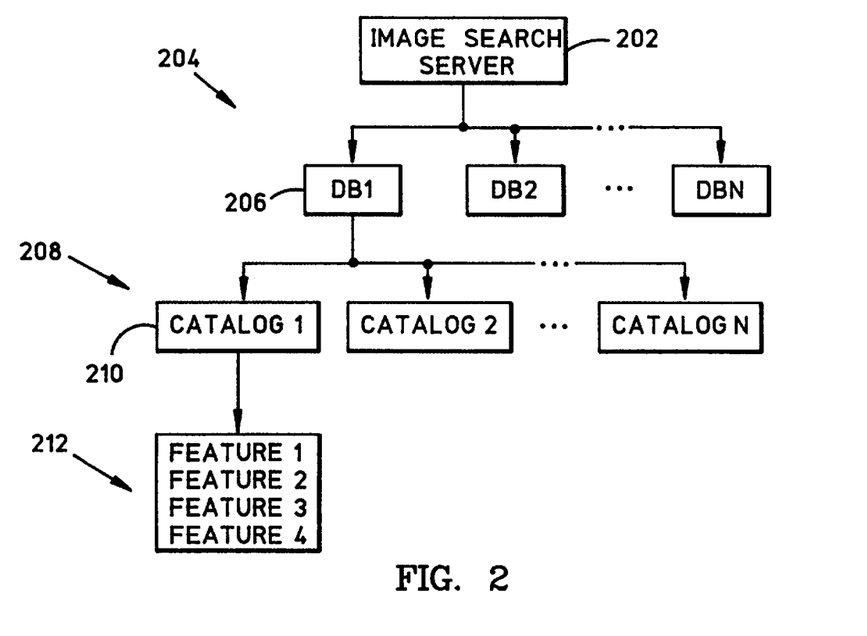
FIG. 2. is a block diagram of an image search server included in the computer system of FIG. 1.

Referring now to FIG. 2, an image search server 202 uses conventional "query by image content" (QBIC) technology to assist in searching on image objects by certain visual properties, such as color and texture. Image search server 202 may run on, for example, AIX or Windows NT. Image search server 202 analyzes images and stores the image information in a plurality of image search databases 204, such as an image search database 206. Each image search database such as image search database 206 holds a plurality of image search catalogs 208. Each image search catalog such as image search catalog 210 stores data corresponding to visual features, such as visual features 212, of a collection of images.

Each of the plurality of image search catalogs 208 stores information about one or more of four image search features: (1) average color; (2) histogram color; (3) positional color; and (4) texture. Average color measures the sum of the color values for all pixels in an image divided by the number of pixels in the image. Images with similar predominant colors have similar average colors. For example, images that contain equal portions of red and yellow will have an average color of orange. Histogram color measures the percentages of color distribution of an image, and histogram analysis separately measures the different colors in an image. For example, an image of the countryside has a histogram that shows a high frequency of blue, green, and gray. Positional color measures the average color value for the pixels in a specified area of an image. Texture measures the coarseness, contrast, and directionality of an image. Coarseness indicates the size of repeating items in an image; contrast identifies the brightness variations in an image; and directionality indicates whether a direction predominates in an image. For example, an image of a wood grain has a similar texture to other images that contain a wood grain.

Users of client 102 of FIG. 1 can execute conventional image queries using the visual properties of images to match colors, textures, and their positions without having to describe them in words. Content-based queries can be combined with text and keyword searches for useful retrieval methods in image and multimedia databases. An image query includes a character string that specifies the search criteria for an image search. The search criteria typically includes (1) a feature name, which designates the feature to be used in the search; (2) a feature value, which corresponds to the value of the feature used; (3) a feature weight, which indicates the emphasis placed on the feature when calculating scores and returning results; and (4) a maximum number of results desired.

Image search server 202 is used as a search engine for finding the images. Image search client applications create image queries, run them, and then evaluate the information returned by image search server 202. Before an application can search images by content, the images must be indexed in one of the plurality of catalogs 208, and the content information must be stored in one of the databases. Typically, client 102 sends a request to library server 104, which forwards the request to object server 106 and responds to the client's request. Object server 106 then responds to the request of library server 104, and delivers the requested digital data object to client 102.

More specifically, client 102 builds a QBIC query string and sends it to image search server 202. Image search server 202 receives the query string and searches the cataloged images for matches. Client 102 receives matches as a list of identifiers and ranks. The identifier for each matching image may consist of an Item ID, a part number, and a RepType. Next, client 102 requests the image part from library server 104. Library server 104 requests that object server 106 send specified image parts to client 102. Object server 106 sends the image parts, and client 102 acknowledges receiving them. Client 102 may then visually display an image on visual output device 114.

Figure 3:
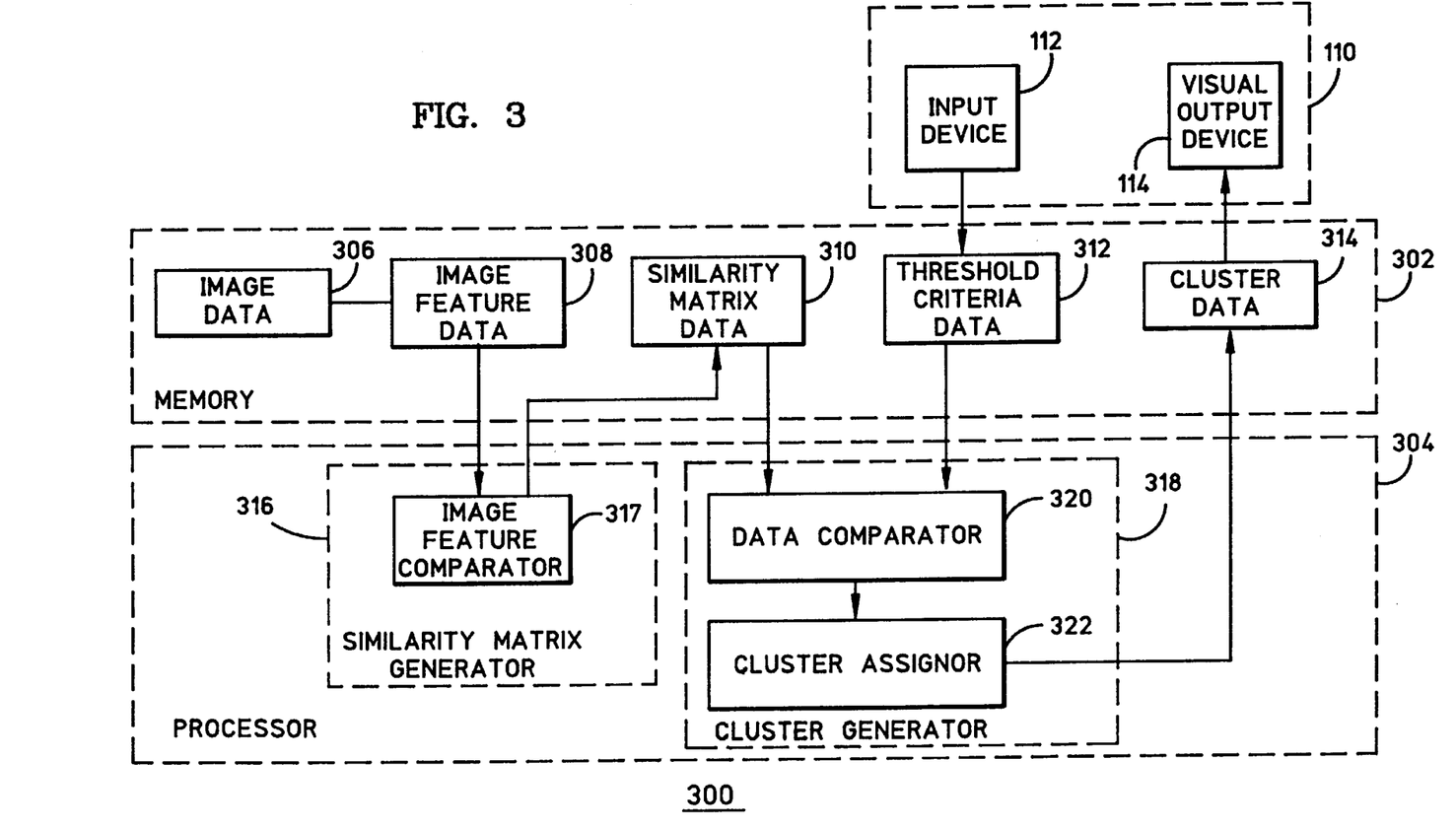
FIG. 3 is a block diagram of an apparatus for identifying subsets of interrelated image objects from a set of image objects.

FIG. 3 shows a block diagram of software and hardware components of an apparatus 300 for identifying subsets of interrelated image objects from a set of image objects. Preferably, apparatus 300 is incorporated in the conventional environment described above. Apparatus 300 generally includes user interface 110 described above, a memory 302 (or memories), and a processor 304 (or processors). Image data 306 and image feature data 308 corresponding to image data 306 are stored in memory 302. Image data 306 includes a set of image objects, and image feature data 308 includes a set of image features for each image object. The image objects may be, for example, data files for creating visual images. The set of image objects will typically include a large number of image objects (10, 100, 1000, etc.); however, the set may include a lesser number such as at least four image objects.

Processor 304 is operative to execute computer software code, which here includes a similarity matrix generator 316 and a cluster generator 318. Similarity matrix generator 316 includes an image feature comparator 317, which is executable to compare image feature data 308 of each image object with image feature data 308 of all other image objects stored in image data 306. Preferably, image feature comparator 317 is executable responsive to a special query at input device 112. Image feature comparator 316 generates similarity matrix data 310, which includes a plurality of similarity values or similarity ranks. Thus, similarity matrix generator 316 may be referred to as a similarity value generator or a similarity rank generator. The plurality of similarity values includes similarities between image features of each image object and all other image objects of the set.

Cluster generator 318 includes a data comparator 320 and a cluster assignor 322. Data comparator 320 has a first data input to receive a plurality of similarity values from similarity matrix 310 and a second data input to receive threshold criteria data 312. Data comparator 320 is executable to compare each of the plurality of similarity values of similarity matrix 310 with threshold criteria data 312, preferably as described below.

Cluster assignor 322 is executable to generate cluster data 314 in connection with data comparator 320. Cluster data 314 include at least one cluster of image object identifiers, which may correspond to a subset of image objects of image data 306. Preferably, cluster assignor 322 generates clusters in a manner such that each image object identifier in a cluster is associated with an image object having a similarity value that meets threshold criteria data 312 with respect to at least one other image object identified in the cluster. Cluster data 314 may be visually displayed on visual output device 114. With this information, image objects corresponding to the image object identifiers in one or more clusters may then be easily retrieved and visually displayed on visual output device 114.

Figure 4:
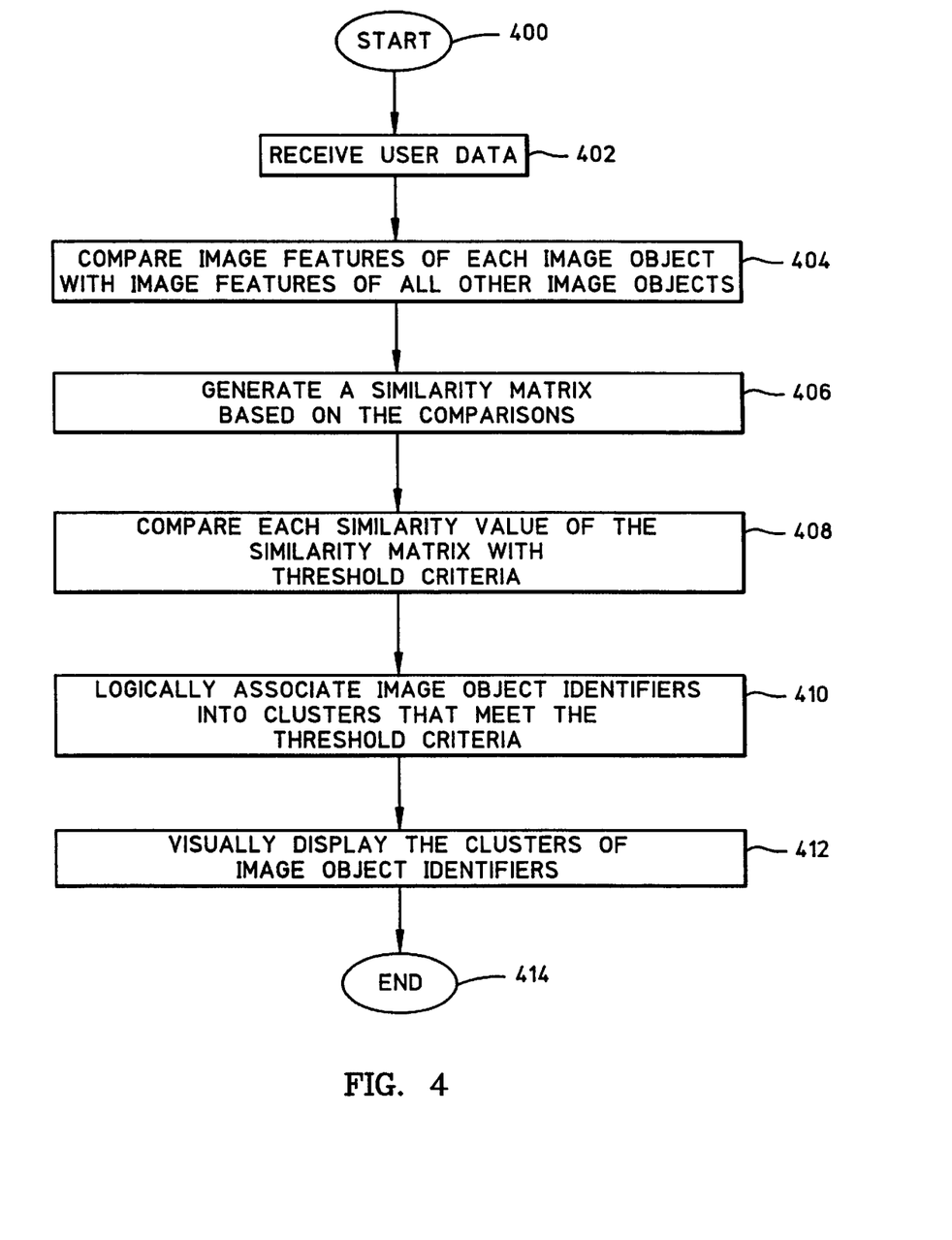
FIG. 4 is a flowchart describing a method of identifying subsets of interrelated image objects from a set of image objects.

FIG. 4 is a flowchart describing a method of identifying subsets of interrelated image objects from a set of image objects. FIGS. 3 and 4 will be referred to in combination. At a start block 400, user data or input is received from input device 112 as part of a special query (step 402). This user data includes threshold criteria data 312, or threshold criteria data 312 at least corresponds to or is derived or obtained from the user data in some suitable manner. The user data or threshold criteria data 312 may be or include, for example, a threshold rank or a threshold rank range. For example, a special query may be executed which, in essence, asks "which image objects of the set are similar enough to meet a threshold rank range of 90–100?". As another example, a special query may be executed which, in essence, asks "which image objects have very similar visual features?" where threshold criteria data 312 corresponding to such query is predetermined (e.g., 90–100 or 80–100).

The user data may additionally include selected image features from the full set of available image features. For example, the special query may in essence ask "which image objects have a threshold rank range of 90–100 between each other, only with respect to average color and texture features?"

In response to receiving the query and user data, image feature comparator 317 compares image feature data 308 associated with each image object with image feature data 308 associated with all other image objects of the set (step 404). Preferably, a comparison is made with at least two features associated with the image objects, which may be the user selected features. Based on these comparisons, similarity matrix data 310 is generated (step 406). Each similarity value of similarity matrix data 310 corresponds to a comparison between images features of each two image objects of the set. Preferably, steps 404 and 406 are performed by executing a conventional image query statement for each image object using the appropriate or selected image features.

Next, data comparator 320 compares each similarity value of the similarity matrix 310 with threshold criteria data 312 (step 408). Each similarity value of similarity matrix data 310 either meets threshold criteria data 312 or does not. Based on such results, cluster assignor 322 logically associates or groups image object identifiers into clusters (step 410). Preferably, cluster generator 318 generates clusters so that the image object identifiers in each cluster correspond to image objects that meet the threshold criteria with respect to at least one other image object identified in the cluster. Also preferably, each image object identifier is uniquely associated with a single cluster (or with no cluster at all).

Finally, the clusters of image object identifiers are visually displayed on visual output device 114 (step 412). The image object identifiers displayed maybe any suitable identifications of the associated image objects, such as file names, file numbers, image IDs, or even the images themselves. Preferably, the image object identifiers of each cluster are displayed together in close physical association on visual output device 114 for easy identification of each cluster. The flowchart ends at an end block 414, designating the end of the particular query and query response. The method preferably continues back at step 402 where user data of another special query is entered.

Figure 6:
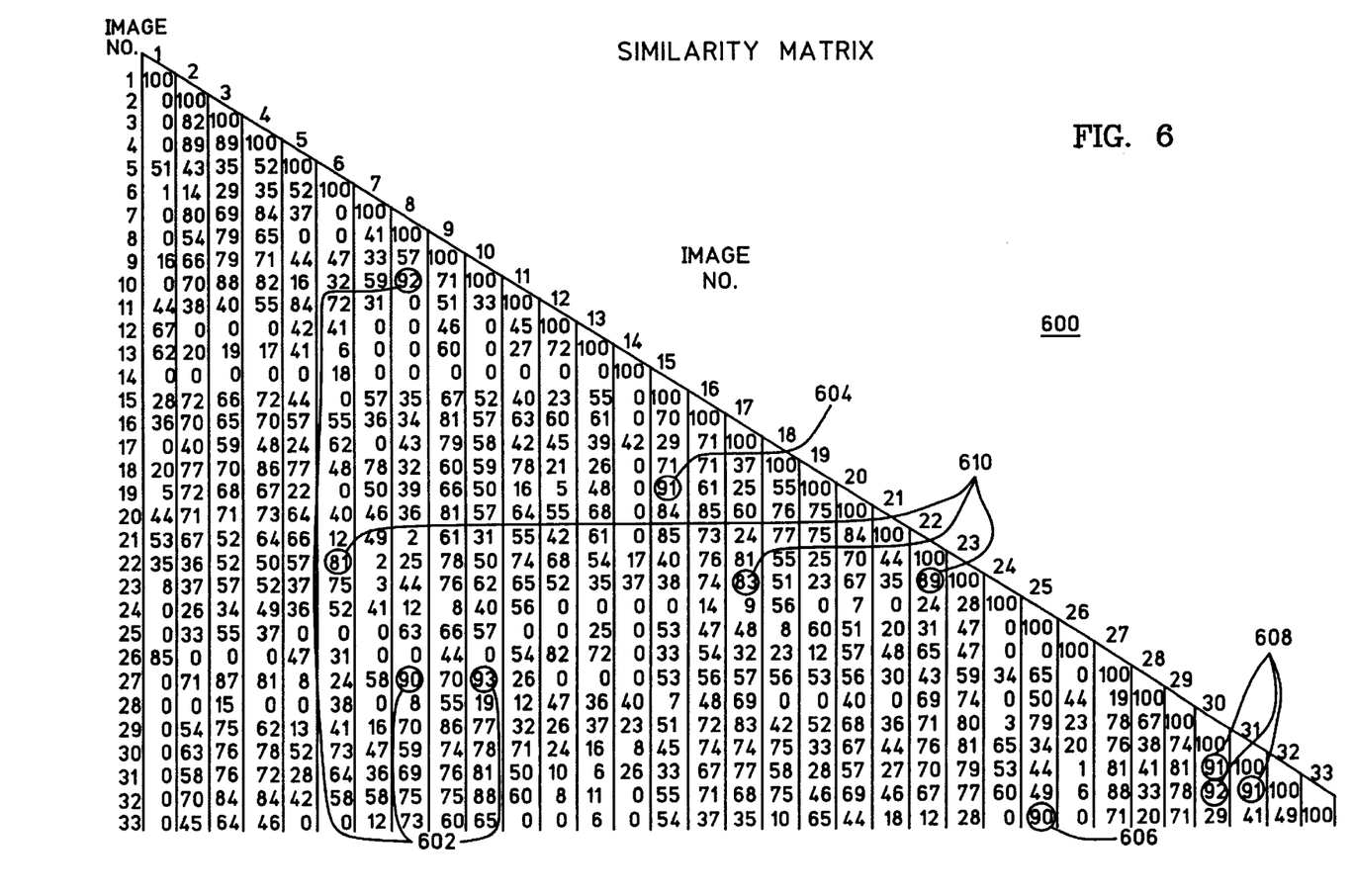
FIG. 6 is an example of a similarity matrix generated based on a particular set of thirty-three image objects.

Referring now to FIG. 6, an example of a similarity matrix 600 generated based on all four visual features of a set of thirty-three selected image objects is illustrated in matrix form. Some of the thirty-three image objects are represented in FIGS. 8–14 (and described below) and were particularly chosen to assist in the description. For clarity, due to the relatively large number of images analyzed, all thirty-three image objects are not shown. The thirty-three image objects selected for analysis each provide a different image of a flower or flowers.

As shown in FIG. 6, similarity matrix 600 does not visually illustrate as a full M-by-M matrix with N=M*M similarity values. Rather, similarity matrix 600 consists of non-redundant similarity values between a set of M image objects. Put another way, similarity values are generated only for each unique combination of two image objects of the set. Also shown in FIG. 4 are non-useful similarity values between the same image objects (each having a value "100") which are merely placeholders in the matrix. Although such a matrix minimizes data and execution, it is understood that redundant and/or non-useful similarity values may be generated and executed upon (and, for example, ignored or "filtered" later with software). Preferably, however, redundant comparisons are not performed in step 304, redundant similarity values are not generated in step 306, and redundant image queries are not executed in steps 304 and 306. Thus, the number of similarity values generated for a set of M image objects is preferably $N=M!/(2*(M-2)!)=M*(M-1)/2$, or at least such number. For example, as shown in FIG. 6 where M=33, at least 528 similarity values are generated ($M*(M-1)/2=33*(33-1)/2=528$).

Figure 7:
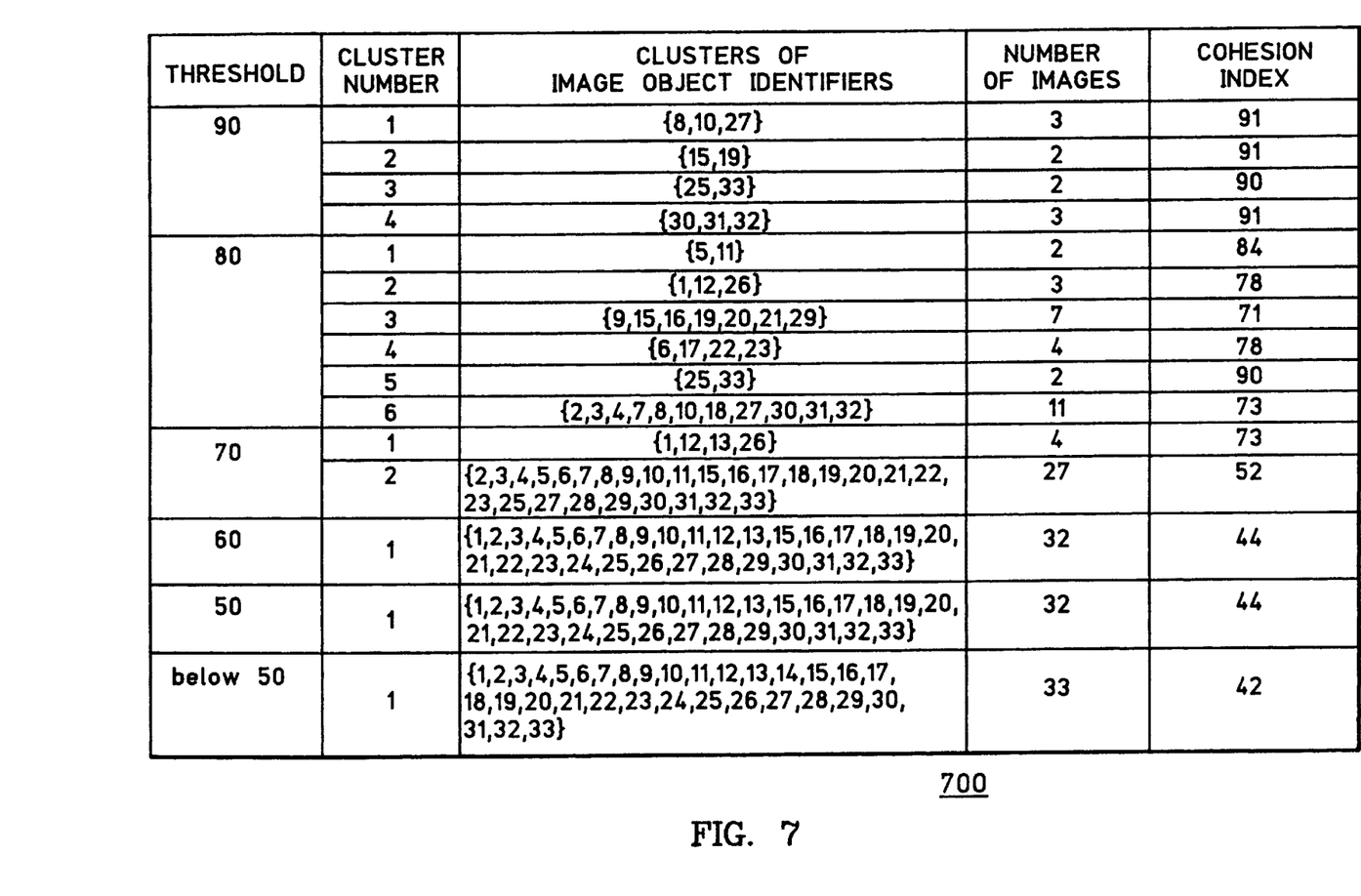
FIG. 7 is a table showing clusters of image object identifiers for given threshold criteria, generated based on the preferred method described in relation to FIGS. 5A, 5B and 5C and the similarity matrix of FIG. 6.

Referring now to FIG. 7, a cluster table 700 based on similarity matrix 600 of FIG. 6 is shown with respect to various threshold criteria. Clusters in cluster table 700 were generated based on the clustering method described in relation to FIGS. 5A, 5B, and 5C, which is discussed in more detail below. Four clusters associated with a threshold range of 90–100 include cluster 1 (image object identifiers 8, 10, and 27), cluster 2 (image object identifiers 15 and 19), cluster 3 (image object identifiers 25 and 33), and cluster 4 (image object identifiers 30, 31, and 32). In addition, for example, a cluster associated with a threshold range of 80–100 (cluster 4) consists of image object identifiers 6, 17, 22, and 23. For each cluster, a cohesion index (which here is an average of the similarity values corresponding to the images in the cluster) as shown in FIG. 7 may be generated and visually displayed in associated with each cluster.

Although all or part of a cluster table such as cluster table 700 may be generated and visually displayed in response to a special query requesting all relationships between image objects, it is preferred that only clusters meeting a particular threshold range are generated and displayed (e.g., clusters 1 through 4 associated with the queried threshold range of 90–100).

As referenced earlier above, FIGS. 8–14 illustrate color images of some of the image objects of the thirty-three image objects utilized. At the present time, these image objects, having file names of flower01.jpg, flower02.jpg, etc., may be obtained and downloaded from the Internet at http://wwwqbic.almaden.ibm.com. To accomodate readers of black-and-white copies of FIGS. 8–14, reference numbers are provided which generally designate colored areas within the images in accordance with the following color key:

| Reference No. | Color |
| --- | --- |
| 802 | WHITE |
| 804 | YELLOW |
| 806 | RED |
| 808 | PINK |
| 810 | ORANGE |
| 812 | GREEN |
| 814 | BLUE |
| 816 | BROWN |
| 818 | GRAY |
| 820 | BLACK |

Figure 8:
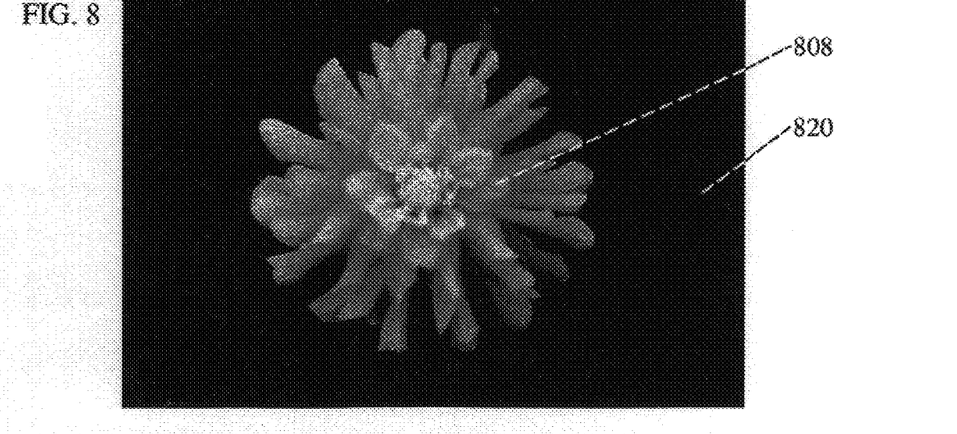
FIG. 8 is a color illustration of an eighth image object of the thirty-three image objects utilized, the eight object being identified in cluster number 1 associated with threshold rank 90 in the table of FIG. 7.
Figure 9:
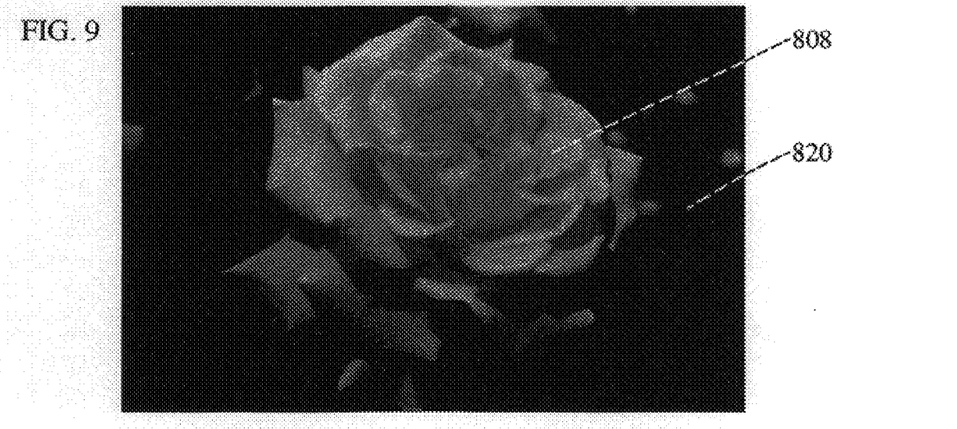
FIG. 9 is a color illustration of a tenth image object of the thirty-three image objects utilized, the tenth image object being identified in cluster number 1 associated with threshold rank 90 in the table of FIG. 7.
Figure 10:
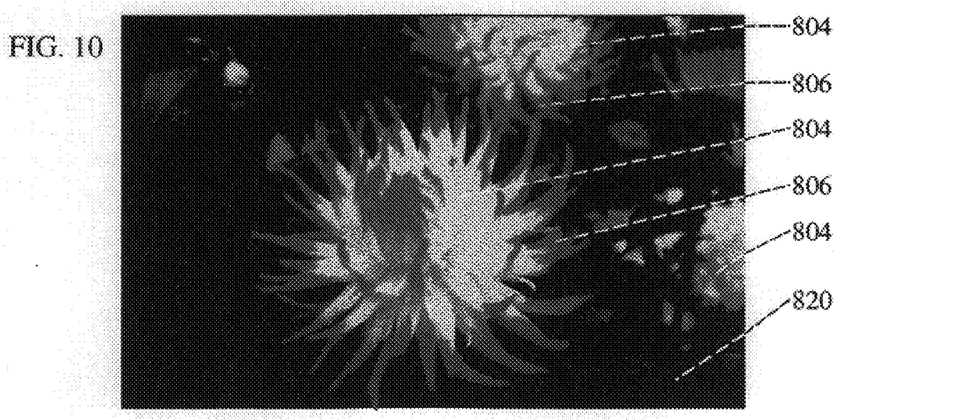
FIG. 10 is a color illustration of a twenty-seventh image object of the thirty-three image objects utilized, the twenty-seventh image object being identified in cluster number 1 associated with threshold rank 90 in the table of FIG. 7.

FIGS. 8, 9, 10 represent images objects corresponding to image object indentifies 8, 10, 27, respectively, of cluster number 1 (threshold=90) in cluster table 700 of FIG. 7. Note the similarities between the visual features of the image objects represented in FIGS. 8–10 (for example, average color, positional color, etc.).

Figure 11:
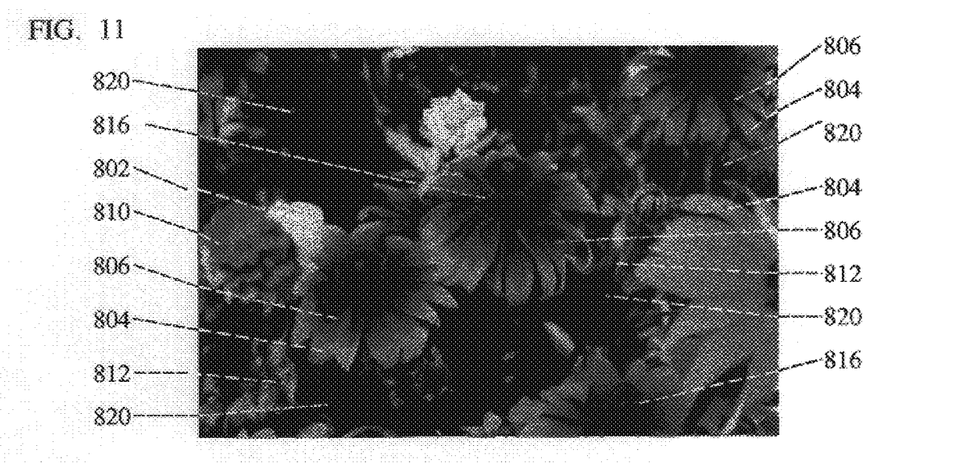
FIG. 11 is a color illustration of a thirtieth image object of the thirty-three image objects. utilized, the thirtieth image object being identified in cluster number 4 associated with threshold rank 90 in the table of FIG. 7.
Figure 12:
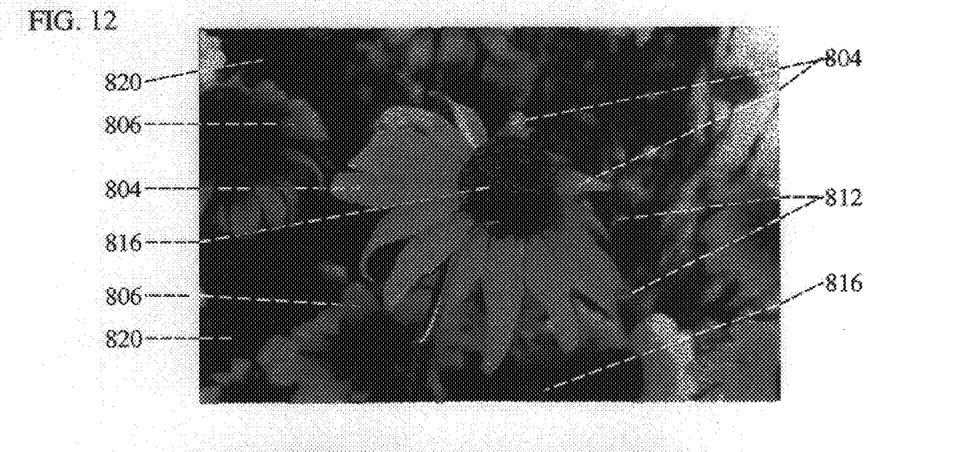
FIG. 12 is a color illustration of a thirty-first image object of the thirty-three image objects utilized, the thirty-first image object being identified in cluster number 4 associated with threshold rank 90 in the table of FIG. 7.
Figure 13:
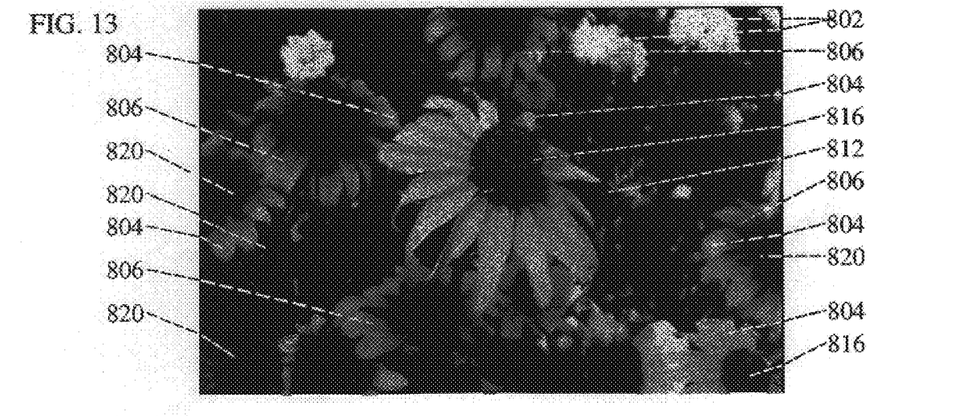
FIG. 13 is a color illustration of a thirty-second image object of the thirty-three image objects utilized, the thirty-second image object being identified in cluster number 4 associated with threshold rank 90 in the table of FIG. 7.

FIGS. 11, 12, and 13 represent image objects corresponding to image object indentifies 30, 31, and 32, respectively, of cluster number 4 (threshold=90) in cluster table 700 of FIG. 7. Note the similarities between the visual features of image objects represented in FIGS. 11–13. Also note the dissimilarities between the visual features shown in FIGS. 11–13 of cluster 4 and those of FIGS. 8–10 of cluster 1.

Figure 14:
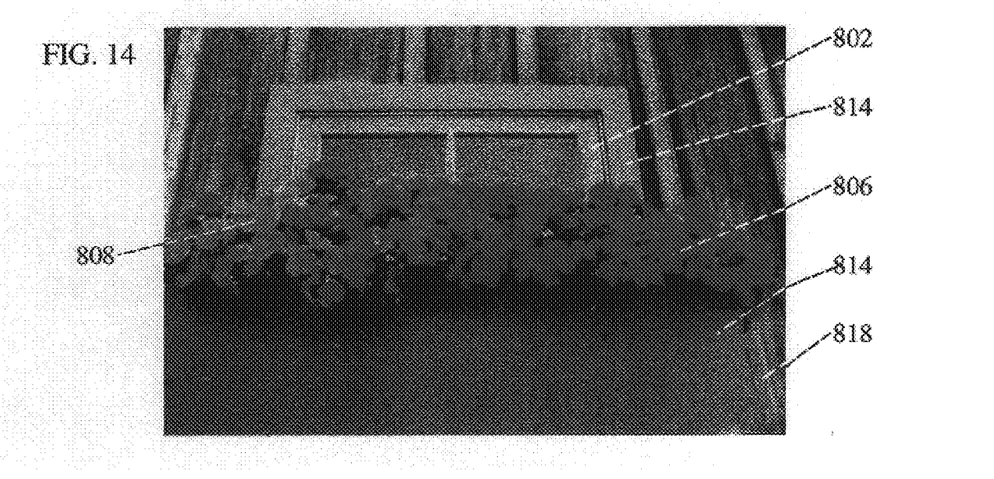
FIG. 14 is a color illustration of a thirteenth image object of the thirty-three image objects utilized the thirteenth image object not being identified in cluster 1 or 4 associated with threshold rank 90 in the table of FIG. 7.

FIG. 14 is an image object corresponding to an image object identifier 13, which is not identified in cluster 1 (having similarity values of 0, 0, and 0 with image object identifiers 8, 10, and 27, respectively, as shown in FIG. 6) nor in cluster 4 (having similarity values of 6, 11, and 6 with image object identifiers 30, 31, and 32, respectively, as shown in FIG. 6) of cluster table 700 of FIG. 7. Note the dissimilarity of visual features between FIG. 14 and each subset of FIGS. 8–10 and FIGS. 11–13.

A preferred and more particular implementation of generating a similarity matrix, such as that illustrated in FIG. 6, is described below in C++ programming language. This particular implementation may be employed in steps 404 and 406 of FIG. 4. Although file names and the number of files, etc., are shown in "hardcoded" form, it is understood and preferred that they be in variable form.

In preparation for formulating the similarity matrix, a set of conventional queries may be initialized for each image object, using code such as or similar to:

```
cmd[0]="QbColorFeatureClass file=<client,
   \"e:\\usr\\local\\qbic\\html\\images
   \\ibm\\flower01.jpg\">";
cmd[0]=cmd[0]+"and QbTextureFeatureClass file=
   <client,\"e:\\usr\\local\\qbic\\html\\images\\
   ibm\\flower01.jpg\">";
cmd[0]=cmd[0]+"and QbDrawFeatureClass file=<client,
   \"e:\\usr\\local\\qbic\\html\\images
   \\ibm\\flower01.jpg\">";
cmd[0]=cmd[0]+"and QbColorHistogramFeatureClass
   file=<client,\"e:\\usr\\local\\qbic\\html\\images
   \\ibm\\flower01.jpg\">";
cmd[1]="QbColorFeatureClass file=<client,
   \"e:\\usr\\local\\qbic\\html\\images
   \\ibm\\flower02.jpg\">";
cmd[1]=cmd[1]+"and QbTextureFeatureClass file=
   <client,\"e:\\usr\\local\\qbic\\html
   \\images\\ibm\\flower02.jpg\">";
cmd[1]=cmd[1]+"and QbDrawFeatureClass file=<client,
   \"e:\\usr\\local\\qbic\\html\\images
   \\ibm\\flower02.jpg\">";
cmd[1]=cmd[1]+"and QbColorHistogramFeatureClass
   file=<client,\"e:\\usr\\local\\qbic\\html
   \\images\\ibm\\flower02.jpg\">";
``` and so on. Comparison and generation of similarity values for each image object against all other image of the set may be executed in connection with conventional queries as follows:

```
for (i=0; i<33; i++)
  {
  pCur=dsQBIC->execute(cmd[i]);
  cout << "qbic query ["<< I << "] done . . . " << endl;
  while (pCur->isValid( ))
    {
    item=pCur->fetchNext( );
    if (item !=0)
      {
      for (j=1; j<=item->dataCount( ); j++)
        {
        a=item->getData(j);
        strDataName=item->getDataName(j);
        switch (a.typeCode( ))
          {
          case DKAny::tc_string:
            {
strData=a;
            //cout << "Attribute name: " << strDataName
            << "
            Value: " << strData << endl;
            break;
            {
            case DKAny::tc_long:
            {
            long lVal=a;
            strData=DKString(lVal);
            //cout << "Attribute name: " << strDataName
            <<"
            Value: " << strData << endl;
            if (strDataName==DKString("DKPartNo"))
            id=strData.asUnsigned( );
            if (strDataName==DKString("DKRank"))
            rank=strData.asUnsigned( );
            break;
            }
          }
        }
      S[id-10][i]=rank; delete item;
      }
    }
  delete pCur;
  }
```

Figure 5A:
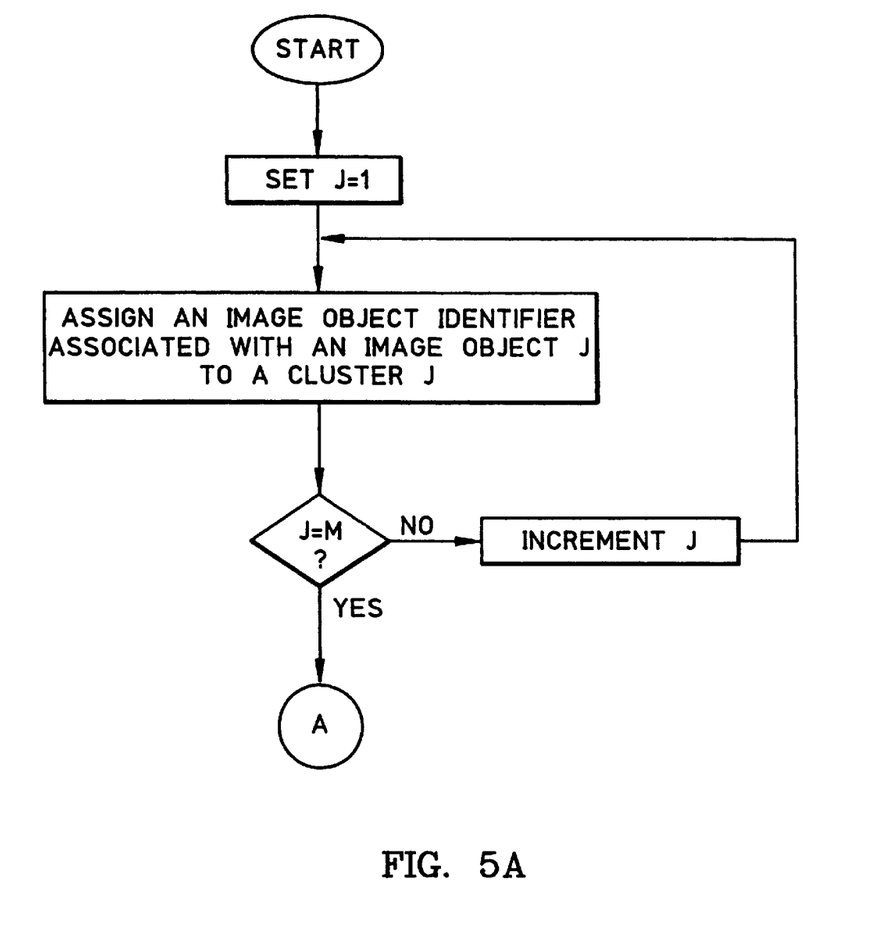
FIG. 5A is a first flowchart of a preferred method of clustering image object identifiers, the first flowchart describing more particularly a cluster initialization procedure.
Figure 5B:
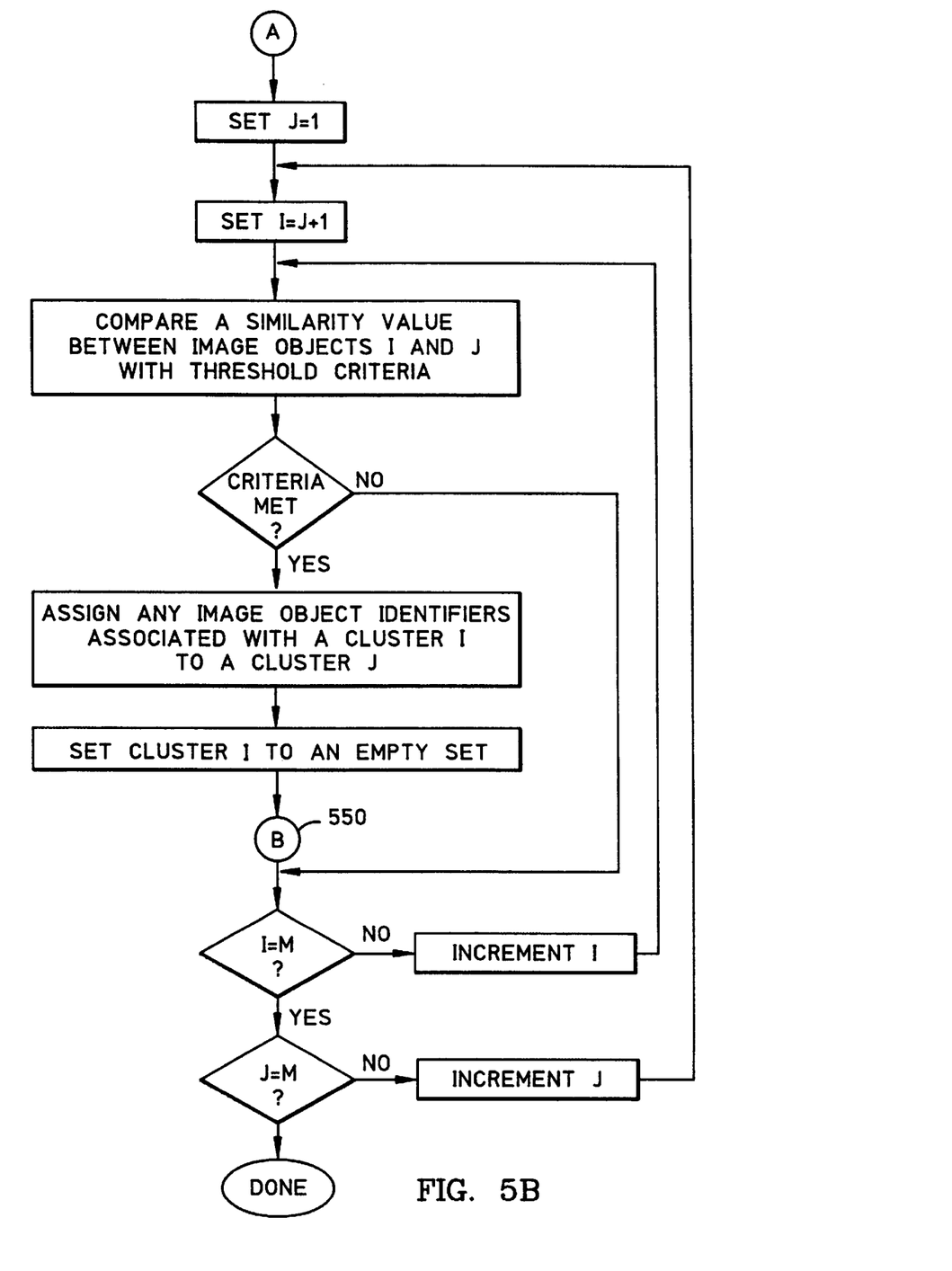
FIG. 5B is a second flowchart of the preferred method of clustering, the second part describing more particularly a primary comparison procedure.
Figure 5C:
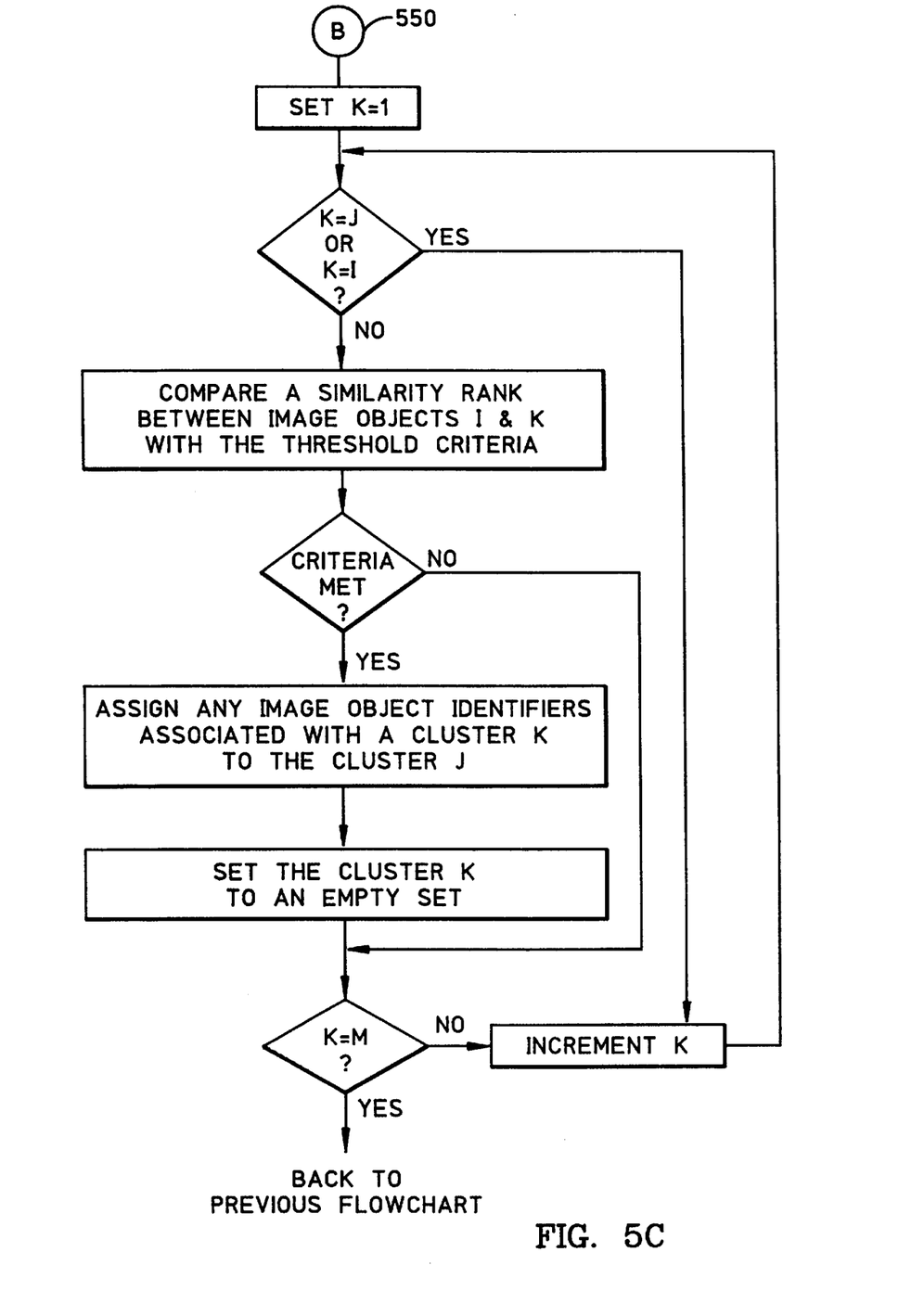
FIG. 5C is a third flowchart of the preferred method of clustering, the third part describing more particularly a secondary or extended comparison procedure.

FIGS. 5A, 5B, and 5C are flowcharts describing a preferred method of clustering image object identifiers using a similarity matrix. This preferred method may be employed in steps 408 and 410 of the flowchart of FIG. 4. FIG. 5A describes a cluster initialization procedure; FIG. 5B describes a clustering procedure using a "primary" comparison; and FIG. 5C describes a clustering procedure using a "secondary" or "extended" comparison.

Before analyzing the flowcharts associated with FIGS. 5A, 5B, and 5C, the preferred primary and extended comparison procedures are best described first with a short, generalized example for forming a single cluster. In response to a special query, a primary comparison is made between the threshold criteria and a similarity value between a first image object and a second image object. If the similarity value does not meet the threshold criteria, then the next primary comparison takes place between the threshold criteria and a similarity value between the first image object and another image object. If the similarity value meets the threshold criteria in the primary comparison, image object identifiers associated with the first image object and the second image object are grouped into a first cluster, and an extended comparison occurs. The extended comparison is made between the threshold criteria and a similarity value between the second image object and a third image object. If the similarity value does not meet the threshold criteria in the extended comparison, then the next extended comparison takes place between the threshold criteria and a similarity value between the second image object and another image object. If the similarity value meets the threshold criteria in the extended comparison, then an image object identifier associated with the third image object is grouped into the first cluster with the other image object identifiers. After the extended comparisons associated with the second image object (and potentially others) are completed, primary comparisons associated with the first image object are continued until completed, until the first cluster is fully formed.

Reference is now made to FIG. 5A, the cluster initialization procedure, which may be described by the following logic (where M=the number of image objects in the set):

For each image object J, where J=1 to M:
    Assigning an image object identifier associated with an image object J to a cluster J.

The primary comparison clustering procedure shown in FIG. 5B may be described by the following logic (note that this logic description excludes the procedure corresponding to a block 550 or block "B" which is associated with the extended comparison):

For each image object J, where J=1 to M:
    For each similarity value between the image object J and an image object I, where I=J+1 to M:
        Comparing a similarity value between the image objects I and J with threshold criteria.
        If the similarity value between the image objects I and J meets the threshold criteria:
            Assigning any image object identifiers associated with a cluster I to a cluster J.
            After assigning, setting the cluster I to an empty set.

The extended comparison clustering procedure shown in FIG. 5C may be described by the following logic:

If the similarity value between the image objects I and J meets the threshold criteria:
    For each similarity value between the image object I and an image object K, where K=1 to M but not where K=J or K=I:
        Comparing the similarity value between the image objects I and K with the threshold criteria.
        If the similarity value between the image objects I and K meets the threshold criteria:
            Assigning any image object identifiers associated with a cluster K to the cluster J.
            After assigning, setting the cluster K to an empty set.

The flowcharts of FIGS. 5A, 5B, and 5C are preferably combined and form a single method for clustering. In addition, the method described in relation to FIGS. 5A, 5B, and 5C may be more particularly applied to a preferred similarity matrix construction, such as that illustrated as similarity matrix 600 in FIG. 6, using a row/column approach in the following manner (where M=the number of image objects in the set, T=a threshold rank, and S is a similarity value between two image objects associated with a row and a column (such as $S_{I,J}$ between two image objects associated with row I and column J)):

FOR J=1 to M
    Assign image $I_J$ to the cluster $C_J$, or $C_J=\{I_J\}$
END
FOR J=1 to M
    FOR I=(J+1) to M
        (Identify image $I_I$ that is similar to image $I_J$ with $S_{I,J}>=T$)
        IF $S_{I,J}>=T$ (Primary comparison)
        THEN
            Merge $C_J$ and $C_I$ into $C_J$, or $C_J=C_J+C_I$ Set $C_I$ to an empty set, or $C_I=\{\}$
            FOR K=(I+1) to M (Identify image $I_K$ that is similar to image $I_I$ with $S_{K,I}>=T$)
                IF $S_{K,I}>=T$ (Extended comparison A)
                THEN
                      Merge $C_J$ and $C_K$ into $C_J$, or $C_J=C_J+C_K$ Set $C_K$ to an empty set, or $C_K=\{\}$
                END
            END
            FOR K=1 to (I−1) (Extended comparison B)
            (Identify image $I_K$ that is similar to image $I_I$ with $S_{I,K}>=T$)
                IF (K<> J AND $S_{I,K}>=T$)
                THEN
                      Merge $C_J$ and $C_K$ into $C_J$, or $C_J=C_J+C_K$ Set $C_K$ to an empty set, or $C_K=\{\}$
                END
            END
        END
    END
END The preferred method described in relation to FIGS. 5A, 5B, and 5C is executed by cluster generator 318 of FIG. 3. By performing this method, cluster generator 318 generates clusters in a manner so that each image object identifier in each cluster corresponds to an image object that meets the threshold criteria with respect to at least one other image object identified in the same cluster. In addition, each image identifier is uniquely associated with only one cluster, or no cluster at all. It is possible that the clustering procedure results in no clusters of interrelated image objects (an empty set), which may occur when image objects are very different from each other and/or the threshold criteria is very large or particular. Some image object identifiers in each cluster may correspond to image objects that do not meet the threshold criteria with respect to others identified in the set. For example, a first image object in a cluster may meet the threshold criteria with respect to a second image object in the cluster, the second image object may meet the threshold criteria with respect to a third image object of the cluster, but the first and the third image objects may not meet the threshold criteria with respect to each other.

Many other suitable clustering methods are readily understood and apparent. For example, although a primary comparison in combination with a single extended comparison is preferred, clustering may be executed using a primary comparison and a plurality of extended comparisons (even up to a maximum limit), or using only a primarily comparison. In another alternate embodiment, for example, clusters are generated such that each image object identifier of each cluster meets the threshold criteria with respect to all other image objects identified in the same cluster.

Referring back to FIG. 6, four similarity value groups associated with four clusters generated based on a threshold value range of 90–100 are identified in similarity matrix 600. A similarity value group 602 (which includes similarity values of 90, 92, and 93) is associated with a cluster that consists of image object identifiers 8, 10, and 27 (cluster 1 corresponding to threshold=90 in FIG. 7 and images in FIGS. 8, 9, and 10); a similarity value group 604 (which includes a similarity value of 91) is associated with a cluster that consists of image object identifiers 15 and 19 (cluster 2 corresponding to threshold=90 in FIG. 7); a similarity value group 606 (which includes a similarity value of 90) is associated with a cluster that consists of image object identifiers 25 and 33 (cluster 3 corresponding to threshold=90 in FIG. 7); and a similarity value group 608 (which includes similarity values of 91, 92, and 91) is associated with a cluster that consists of image objects identifiers 30, 31, and 32 (cluster 4 corresponding to threshold=90 in FIG. 7 and FIGS. 11, 12, and 13).

Associated with a different threshold range (threshold range=80–100), a similarity value group 610 (which includes similarity values of 81, 83, and 89) is associated with a cluster that consists of image object identifiers 6, 17, 22, and 23 (cluster 4 corresponding to threshold=80 in FIG. 7). With respect to this cluster 4, note that image object identifier 23 has a similarity value that exceeds a threshold value of 80 with respect to each of image object identifiers 17 and 22 (similarity values of 83 and 89, respectively), but not with respect to image object identifier 6 (similarity value of 75). However, image object identifier 22 has a similarity value that exceeds the threshold value with respect to image object identifier 6 (similarity value of 81).

The image object identifiers associated with the above clusters corresponding to similarity value groups 602, 604, 606, 608, and 610 were clustered based on execution of the primary comparison procedure of FIG. 5B, and in some cases based on combined execution of the primary and extended comparison procedures of FIGS. 5B and 5C.

It is understood by the inventor, and should be by those skilled in the art, that the method and apparatus described herein may be modified in a variety of ways within the true spirit and scope of the present invention. For example, although image objects are described in this particular application, other complex data objects (audio, video, etc.) could be acted upon in the same or similar manner. As another example, other image features than those described may be added to the set of existing features associated with image objects, and utilized in the present invention.

As yet another example, one or more similarity matrices (one for each different subset and full set of image features) may be generated and stored in memory before a given query. Similarly, a cluster table or tables (such as cluster table 700 of FIG. 7) may be generated and stored in memory before the given query. Here, updates or maintenance of such matrices and/or cluster tables may be performed after each new entry of an image object into the database. This maintenance could be manually or automatically performed by the system. For example, the system could automatically perform maintenance immediately in response to the new entry, or at predetermined time periods, or at predetermined time periods if any new entries have been made. That is, such matrices and/or cluster tables may be generated in response to a single request (e.g., an administrative maintenance request) different from the query request.

Thus, the enhancement of image clustering to conventional image query technology greatly improves "visual mining" capabilities. The present invention preferably enhances the. already powerful capabilities of the QBIC technology offered in the IBM Digital Library (DL) product. This enhancement is very practical in digital imagery; it helps users to understand the interrelationships between a collection of images. The ability to query for such interrelationships is particularly important in certain kinds of businesses such as advertising agencies, animation production firms, etc.

I claim:

1. A method of clustering image object identifiers, comprising:

(a) comparing a threshold criteria designated by a user in a query with each one of a first plurality of similarity values, the first plurality of similarity values being between a first image object and other image objects of a set, wherein the threshold criteria is a fixed range of values designated by the user indicating a required degree of similarity between the image features of the image objects in a cluster;

(b) in response to determining that a similarity value between the first image object and a second image object meets the threshold criteria from comparing in (a), comparing the threshold criteria with each one of a second plurality of similarity values, the second plurality of similarity values being between the second image object and other image objects of the set; and (c) in response to determining that a similarity value between the second image object and a third image object meets the threshold criteria from comparing in (b), logically grouping image object identifiers associated with the first, second, and third image objects into a cluster.

2. A method according to claim 1, further comprising:

(d) receiving a query from an input device, the query associated with the threshold criteria; and (e) visually displaying the logical grouping of image object identifiers at a visual output device.

3. A method according to claim 2, wherein comparing in (a) is responsive to receiving the query in (d).

4. A method according to claim 2, further comprising:

generating the first and the second pluralities of similarity values responsive to receiving the query in (d).

5. Software for generating clusters of image object identifiers, comprising:

primary compare software, said primary compare software executable to compare a threshold criteria designated by a user in a query with each one of a first plurality of similarity values, the first plurality of similarity values being between a first image object and other image objects of the set, wherein the threshold criteria is a fixed range of values designated by the user indicating a required degree of similarity between the image features of the image objects in a cluster; and secondary compare software, said secondary compare software executable in response to determining from said primary compare software that a similarity value between the first image object and a second image object meets the threshold criteria, said secondary compare software executable to compare the threshold criteria with each one of a second plurality of similarity values, the second plurality of similarity values being between the second image object and other image objects of the set.

6. A method of clustering image object identifiers associated with a set of M image objects, comprising:

for each image object J, where J=1 to M:
assigning an image object identifier associated with an image object J to a cluster J;

for each image object J, where J=1 to M:
for each similarity rank between the image object J and an image object I, where I=J+1 and object image I is associated with an image object identifier assigned to a cluster I:
comparing the similarity rank between the image objects I and J with a threshold criteria designated by a user in a query, wherein the threshold criteria is a fixed range of values designated by the user indicating a required degree of similarity between the image features of the image objects in a cluster;
if the similarity rank between the image objects I and J meets the threshold criteria:
reassigning the image object identifier assigned to cluster I to cluster J; and
after reassigning, setting the cluster I to an empty set.

7. A method according to claim 6, wherein after the step of setting the cluster I to an empty set, the method further comprising:

for each similarity rank between the image object I and an image object K, where K=1 to M except where K=J or K=I, and object image K is associated with at least one image object identifier assigned to a cluster K;
comparing the similarity rank between the image objects I and K with the threshold criteria;
if the similarity rank between the image objects I and K meets the threshold criteria:
reassigning the at least one image object identifier assigned to cluster K to the cluster J; and
after reassigning, setting the cluster K to an empty set.

8. An apparatus, comprising:

a similarity value generator, said similarity value generator operative to generate similarity values between image features of all image objects of a set of image objects, wherein the image features include average color, histogram color, positional color and texture; and a cluster generator, said cluster generator operative to generate at least one subset of image object identifiers based on a first comparison between a threshold criteria and each one of a first plurality of similarity values, the first plurality of similarity values being between a first image object and other image objects of the set, wherein the threshold criteria is a fixed range of values designated by a user indicating a required degree of similarity between the image features of the image objects in a cluster, and, in response to determining that a similarity value between the first image object and a second image object meets the threshold criteria, a second comparison between the threshold criteria and each one of a second plurality of similarity values, the second plurality of similarity values being between the second image object and other image objects of the set;

wherein said cluster generator operative to logically group image object identifiers associated with the first, second, and third image objects into a cluster if a similarity value between the second image object and a third image object meets the threshold criteria.

9. A method of identifying subsets of interrelated image objects from a set of image objects, comprising:

comparing image features of each image object of the set with image features of all other image objects of the set, wherein the image features compared include average color, histogram color, positional color and texture;

generating a similarity value for each comparison;

comparing a threshold criteria designated by a user in a query with each one of a first plurality of similarity values, the first plurality of similarity values being between a first image object and other image objects of a set, wherein the threshold criteria is a fixed range of values designated by the user indicating a required degree of similarity between the image features of the image objects in a cluster;

in response to determining that a similarity value between the first image object and a second image object meets the threshold criteria, comparing the threshold criteria with each one of a second plurality of similarity values, the second plurality of similarity values being between the second image object and other image objects of the set; and in response to determining that a similarity value between the second image object and a third image object meets the threshold criteria, logically grouping image object identifiers associated with the first, second, and third image objects into a cluster.

10. A computer software product, comprising:

similarity value generator code, said similarity value generator code executable to generate a similarity value for image features of each image object and all other image objects of a set of at least four image objects in response to a single request, wherein the image features include average color, histogram color, positional color and texture;

cluster generator code, said cluster generator code executable to generate at least one cluster of image object identifiers, wherein the cluster generator code further includes:

primary compare software, said primary compare software executable to compare a threshold criteria designated by a user in a query with each one of a first plurality of similarity values, the first plurality of similarity values being between a first image object and other image objects of the set, wherein the threshold criteria is a fixed range of values designated by the user indicating a required degree of similarity between the image features of the image objects in a cluster; and secondary compare software, said secondary compare software, in response to determining from said primary compare software, that a similarity value between the first image object and a second image object meets the threshold criteria, said secondary compare software executable to compare the threshold criteria with each one of a second plurality of similarity values, the second plurality of similarity values being between the second image object and other image objects of the set.

* * * * *